Figure 1:
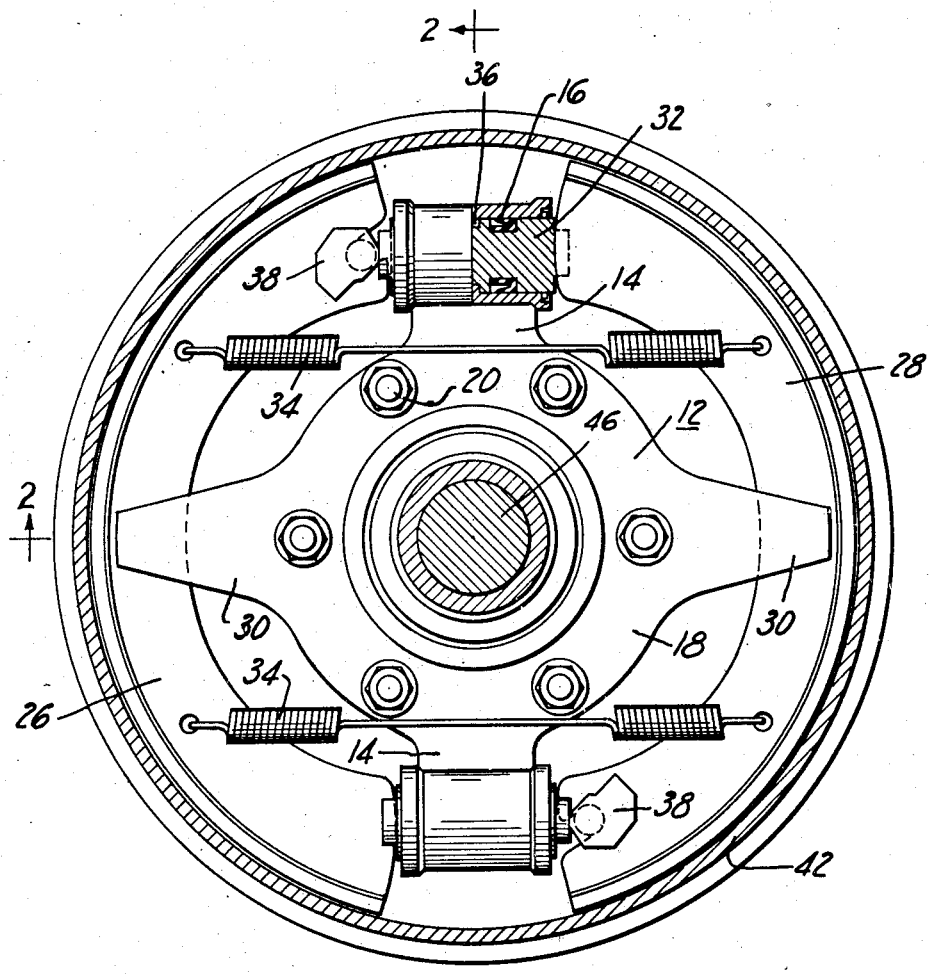

Oct. 28, 1947.  B. E. HOUSE  2,429,815
BRAKE, WHEEL, AND AXLE ASSEMBLY
Filed Nov. 24, 1944   2 Sheets-Sheet 1

INVENTOR.
BRYAN E. HOUSE
BY

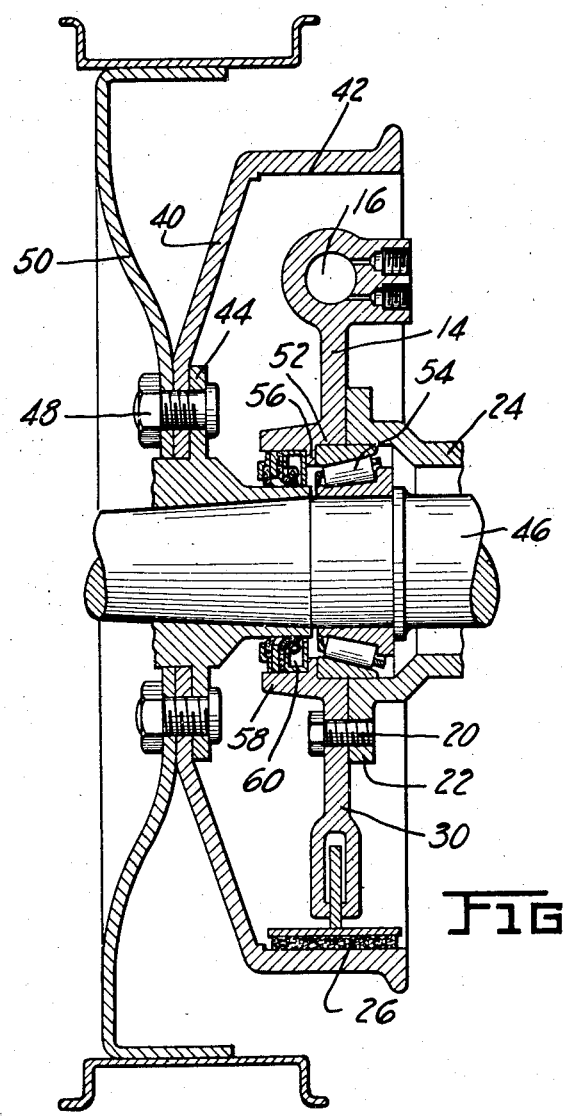

Patented Oct. 28, 1947

2,429,815

UNITED STATES PATENT OFFICE 2,429,815

BRAKE, WHEEL, AND AXLE ASSEMBLY

Bryan E. House, South Bend, Ind., assignor to Bendix Aviation Corporation, South Bend, Ind., a corporation of Delaware Application November 24, 1944, Serial No. 564,966

4 Claims. (Cl. 188—152)

This invention relates to brake, wheel, and axle assemblies wherein means are provided for absorbing the torque of a drum type brake.

An object of the invention is to simplify the construction of the brake torque-taking structure and additionally to simplify the construction of the axle and axle housing.

As a primary step toward accomplishing the end of simplification of the structure, the number of component parts has been drastically reduced.

Other objects and advantages of the present invention will become apparent during the course of the following description, reference being had therein to the accompanying drawings, in which, Figure 1 is a plan view of a brake assembly illustrating an embodiment of my invention; and Figure 2 is a section taken on the line 2—2 of Figure 1.

Referring to the figures, a spider 12, which may be formed by casting or forging, has one or more integral thickened legs 14 in which cylinder bores 16 are provided. The central portion of the spider 12 is preferably formed as a flat disk or plate 18 having a plurality of openings through which suitable fastening members, such as bolts 20, may extend, the bolts serving to secure the spider to the flange 22 of axle housing 24. The arrangement is such as to be suitable for the rear wheels of an automotive vehicle.

In the illustrated arrangement two integral thickened legs 14 are provided, each having a cylinder bore. Two brake shoes 26 and 28 are arranged at opposite sides of the spider with their ends adjacent the cylinders 16. The webs of the shoes are preferably located in substantially the same plane as the flat center portion 18 of the spider, in order to minimize bending stresses in the spider. The spider is provided with a plurality of bifurcated arms 30 which receive the webs of the shoes and thus locate the shoes laterally.

A spreading force may be applied to the ends of the shoes by means of a pair of pistons 32 in each cylinder bore, said shoes being normally held in released position by two return springs 34. In the illustrated arrangement, the anchoring torque of the shoes is transmitted through the pistons to centrally located anchor flanges 36 provided in the cylinders, and thus to the integral plate portion 18 of the spider which is secured to the fixed axle housing. The shoes may abut directly against the pistons at one end, as shown, and may be spaced from the pistons at the other end by means of adjustors 38, comparable to those shown in Goepfrich and House application Serial No. 502,858, filed September 18, 1943.

Each of the shoes is self-energizing in both directions of drum rotation in accordance with well understood principles of brake operation. The drum 40, which is provided with a cylindrical braking flange 42, is shown secured by means of a plurality of bolts 48 to the flange 44 fixed on rotatable axle 46. The wheel 50 is also secured to the axle. In order to further simplify the construction of the brake and axle assembly, the spider 12 may be provided with an integral substantially cylindrical axially extending portion 52 which may serve as the housing or retainer for the bearing 54, the outer race of the bearing being supported against the cylindrical portion 52 of the spider and an internal shoulder 56 formed thereon.

Furthermore, the cylindrical axially extending portion 52 of the spider 12 may be elongated as shown at 58 to provide a retainer for the seal 60 which retains the lubricating fluid inside the axle housing.

This arrangement obviates the necessity for providing a separate bearing retainer and seal retainer and thus appreciably reduces the number of parts required in the assembly.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a drum brake, a torque member having a central disc portion adapted to be secured to a fixed part of a vehicle and lying in substantially the center plane of the brake, an integral thickened leg portion extending from said central disc portion and having a cylinder bore therein, and an integral cylindrical axially extending center portion forming a bearing retainer.

2. In a drum brake, a torque member having a central disc portion adapted to be secured to the axle housing of a vehicle, an integral thickened leg portion extending from said central disc portion and having a cylinder bore therein, and an integral cylindrical axially extending center portion forming a bearing retainer.

3. In a drum brake, a torque member having a central disc portion adapted to be secured to the axle housing of a vehicle, an integral thickened leg portion extending from said central disc portion and having a cylinder bore therein, and an integral cylindrical axially extending center portion forming a bearing retainer and also a retainer for a lubricant seal.

4. In a drum brake, a torque member having a central disc portion adapted to be secured to the axle housing of a vehicle, an integral thickened leg portion extending from said central disc portion and having a cylinder bore therein, and an integral cylindrical axially extending center portion forming a retainer for a lubricant seal.

BRYAN E. HOUSE.

REFERENCES CITED

The following references are of record in the file of this patent:

UNITED STATES PATENTS

| Number | Name | Date |
|---|---|---|
| 1,988,594 | Heinze | Jan. 22, 1935 |
| 2,171,585 | Mattersdorf | Sept. 5, 1939 |
| 2,176,927 | Sauzedde | Oct. 24, 1939 |
| 2,245,682 | Kerr | June 17, 1941 |
| 2,322,121 | Frank | June 15, 1943 |